Oct. 6, 1953 J. W. ROBINSON 2,654,440
FILTER ELEMENT FORMED OF PAPER IMPREGNATED
WITH THERMOPLASTIC RESIN
Filed Oct. 18, 1951
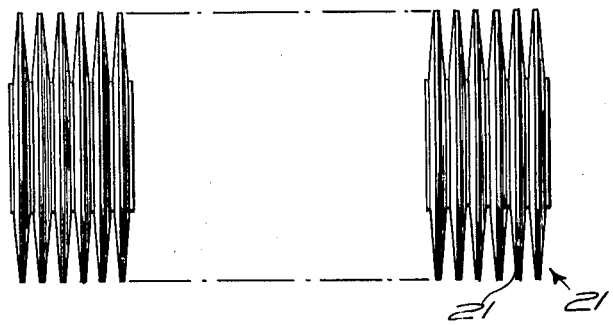
FIG.1
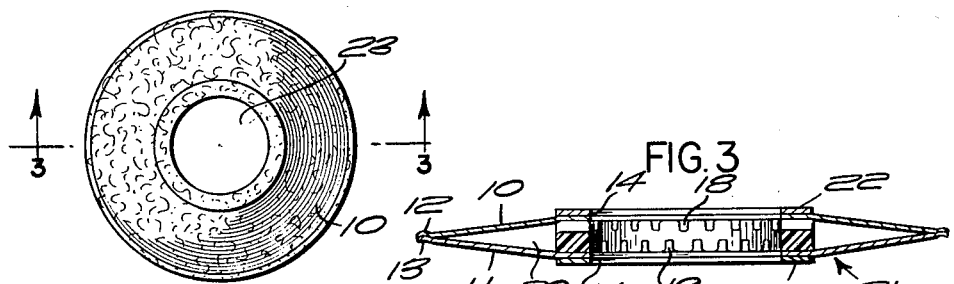
FIG.2     FIG.3
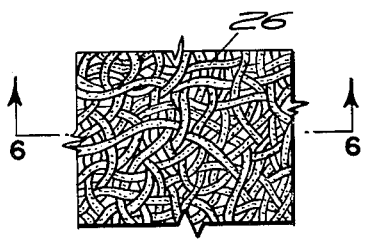     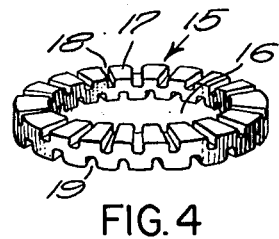
FIG.5     FIG.4
FIG.6
INVENTOR.
John Warren Robinson
BY
ATTORNEYS Patented Oct. 6, 1953

2,654,440

UNITED STATES PATENT OFFICE 2,654,440

FILTER ELEMENT FORMED OF PAPER IMPREGNATED WITH THERMOPLASTIC RESIN

John Warren Robinson, Atlantic Beach, Fla., assignor to Fram Corporation, a corporation of Rhode Island Application October 18, 1951, Serial No. 251,964

2 Claims. (Cl. 183—44)

This invention relates to a filter element which is formed of paper.

Heretofore, paper has been used for providing filter elements of various shapes which require the paper to be variously formed, such for instance as cutting the paper into pre-determined shapes and then from these shapes forming the filter element.

One of the objects of this invention is to provide a filter element formed from paper which will be self-supporting.

Another object of the invention is to provide a filter element formed from paper which may be sealed, such for instance as by heat or pressure or both, without adding any material to the paper after made in desired form.

Another object of the invention is to provide a filter element of paper which will be sufficiently stiff so as to be self-supporting.

Another object of the invention is to provide a filter element from filter paper having the above qualities which will have a porosity to enable a relatively fast flow through the paper.

Another object of the invention is to provide a filter element the paper of which may be formed into shapes and held in those shapes after heat has been applied to the paper.

With these and other objects in view, the invention consists of certain novel features of construction, as will be more fully described and particularly pointed out in the appended claims.

With reference to the drawings:

Fig. 1 is an elevation of an essential part of a filter element which is formed in accordance with this invention;

Fig. 2 is an end view of a structure of Fig. 1;

Fig. 3 is a section through one of the cells of the filter on line 3—3 of Fig. 2;

Fig. 4 is a perspective view of a separator for one of the cells;

Fig. 5 is a plan view on an enlarged scale of paper used;

Fig. 6 is a section on line 6—6 of Fig. 5.

In preceding with this invention, I form the filter element from cells having center openings with the center openings in axial alignment. The cells are each formed of paper of a particular character which has in it a resin impregnated in the fibers and which resin may be used for sealing the parts of the paper one to the other by heat and pressure or both.

With reference to the drawings, the unit cell which is shown is best illustrated in Fig. 3 and there comprises pieces 10 and 11 of paper, each of which has a circular periphery, the sheets being substantially the same size. The outer peripheries 12 and 13 of these sheets are sealed by being pressed together at about 1000 lbs. per square inch, providing a slight groove on the portion 13 and a rib on the portion 12. Each of these sheets 10 and 11 has a center opening 14, which openings are in registry and aligned with a spacer 15 placed between the inner marginal edges of the opening 14, which spacer also has an opening 16 and on its opposite faces 17, there are grooves 18 and 19 which are in staggered arrangement. Thus, when the spacer which may be formed of Bakelite or some resin, or of some rigid character is placed between the marginal edges 14, the inner marginal edges 14 are placed a distance apart and the area between the sheets 10 and 11 at 20 is in communication with the center axial opening of the sheets through the passages 18 and 19.

Cells thus described and designated generally 21 are then placed in axial alignment and there may be positioned between each of the cells a washer 22 which will have an opening registering with the opening 23 through the cells or this washer may be omitted. I have illustrated a washer on either side of the shell shown in Fig. 3.

The paper which is used is of importance in this invention and comprises a fibrous material which may be any fibers from which paper may be made. I have found that southern kraft is very acceptable. The fibers are placed in water and passed through a regular paper machine and partially dried and then the paper is treated to impregnate each of the fibers with a resin by the process which is shown in I. J. Novak Pat. No. 1,966,458, dated July 17, 1934.

The resin which is used is a soluble thermoplastic and thermo-setting resin such as phenol formaldehyde in an amount which will provide in the web a residual resin solid content of 20-60% by weight of the dried paper. Urea formaldehyde or melamine formaldehyde may be substituted for the phenol formaldehyde. This type of resin by being thermo-plastic will permit the resin to serve as a bond upon the application of heat or heat and pressure so that the edges 12 and 13 of the paper may be sealed together while the cells may be sealed one to the other or to washers between them which are formed by the same paper material likewise by heat and pressure to form a good bond between them, thus making unnecessary the addition of any adhesive or the like. Further, upon the application of heat sufficient to cause polymerization of the resin into its set form after the element is finished, the paper becomes set into the shape desired and sufficiently stiff so that it maintains its own shape. This polymerization is caused by a function of heat and time, and one may vary at the expense of the other.

The paper is also formed so that it will have a porosity from 5/10 to 30 seconds as obtained on the Gurley densitometer, Gurley being a measure of time in which 100 cc. of air may be forced through a ¼ square inch area of paper under a load of 5 oz. By the use of the process above referred to, wherein the fibers are swollen by water and then impregnated with the resin, less resin is required for the same stiffness, water resistance, and the like of the finished product. The resin which is chosen is chosen for resistance to water after it has been polymerized so as to condense it and also for the resistance to acids particularly those which may be formed from hydrocarbons or pyrolytic decomposition products of hydrocarbons. Other paper bases such as cotton linters or sisal may be used.

The impregnation of the fibers as shown by the dots 25 in the fibers 26 in Fig. 5 also makes a better paper for a filtering use than where a coating is used on the paper after it has been finished as the coating will interfere with the porosity of the filter paper.

I claim:

1. A filter element comprising a plurality of cells having center openings in axial alignment providing an axial passage, each cell comprising a pair of sheets of paper contacting at their outer periphery and provided with registering center apertures forming said passage with the aperture edges spaced to communicate with the said passage, said paper sheets having a porosity of from .5 to 30 seconds Gurley and being formed from fibrous pulp with the fibers each impregnated with a thermoplastic and thermo-setting resin, said contacting edges of the sheets of paper being sealed by the resin in one sheet adhering to the resin in the other sheet and said cells being sealed one to the other by a bond formed by means of the resin in the adjacent cells.

2. A filter as in claim 1, wherein a washer of the same material is positioned between said cells and bonded to adjacent cells by the resin in the washer and contiguous cells.

JOHN WARREN ROBINSON.

References Cited in the file of this patent

UNITED STATES PATENTS

| Number | Name | Date |
|---|---|---|
| 1,989,795 | Fellows | Feb. 5, 1935 |
| 2,569,243 | Kovacs | Sept. 25, 1951 |